United States Patent
Suzuki et al.

(10) Patent No.: US 9,598,029 B2
(45) Date of Patent: Mar. 21, 2017

(54) BAND CLIP AND ASSEMBLY

(71) Applicant: Sumitomo Wiring Systems, Ltd., Yokkaichi, Mie (JP)

(72) Inventors: Yoshie Suzuki, Mie (JP); Yasuhiro Kajiwara, Mie (JP)

(73) Assignee: SUMITOMO WIRING SYSTEMS, LTD., Yokkaichi-Mie (JP)

( * ) Notice: Subject to any disclaimer, the term of this patent is extended or adjusted under 35 U.S.C. 154(b) by 0 days.

(21) Appl. No.: 14/787,540

(22) PCT Filed: Apr. 21, 2014

(86) PCT No.: PCT/JP2014/061136
§ 371 (c)(1),
(2) Date: Oct. 28, 2015

(87) PCT Pub. No.: WO2014/181668
PCT Pub. Date: Nov. 13, 2014

(65) Prior Publication Data
US 2016/0121821 A1    May 5, 2016

(30) Foreign Application Priority Data
May 10, 2013   (JP) ................................ 2013-099857

(51) Int. Cl.
*B60R 16/00*   (2006.01)
*B60N 3/04*    (2006.01)
(Continued)

(52) U.S. Cl.
CPC .......... *B60R 16/0215* (2013.01); *B60N 3/046* (2013.01); *B65D 63/1027* (2013.01);
(Continued)

(58) Field of Classification Search
CPC .. B60R 16/2015; B65D 63/1027; D02G 3/30; Y10T 24/1498
(Continued)

(56) References Cited

U.S. PATENT DOCUMENTS

| 4,288,017 | A |   | 9/1981 | Russell |
|---|---|---|---|---|
| 4,447,934 | A | * | 5/1984 | Anscher ................. F16L 3/233 24/16 PB |

(Continued)

FOREIGN PATENT DOCUMENTS

| JP | 45-15891 | 6/1970 |
|---|---|---|
| JP | 54-63949 | 5/1979 |

(Continued)

OTHER PUBLICATIONS

International Search Report.

*Primary Examiner* — Dennis H Pedder
(74) *Attorney, Agent, or Firm* — Gerald E. Hespos; Michael J. Porco; Matthew T. Hespos (57) ABSTRACT

A band clip (1000) that suppresses projection from a sheet includes a binding band (1020) and a clip (1021). The binding band (1020) includes a head (1040) and a strap (1041) and the clip (1021) includes retainers (1060) as linear objects, a penetrating body (1061) as a linear object and a piercing stopper (1062) as a plate-like object. One end of the penetrating body (1061) is coupled to a base end of each of the retainers (1060). The retainers (1060) are respectively at an angle not larger than 90° to the penetrating body (1061), arranged in a distributed manner in a circumferential direction and resiliently deformable to extend along the penetrating body (1061). Another end of the penetrating body (1061) is coupled to a first principal surface (1160) of the piercing stopper (1062). The head (1040) is coupled to a second principal surface (1161) of the piercing stopper (1062).

2 Claims, 6 Drawing Sheets (51) Int. Cl.
*B60R 16/02* (2006.01)
*H02G 3/30* (2006.01)
*B65D 63/10* (2006.01)
*F16B 2/08* (2006.01)
*F16B 9/02* (2006.01)

(52) U.S. Cl.
CPC ......... *H02G 3/30* (2013.01); *B65D 2563/108* (2013.01); *F16B 2/08* (2013.01); *F16B 9/023* (2013.01)

(58) Field of Classification Search
USPC ..................... 296/208, 97.23; 24/16 PB, 297
See application file for complete search history.

(56) References Cited

U.S. PATENT DOCUMENTS 4,572,466 A * 2/1986 Yamaguchi ............. F16L 3/233
24/16 PB
4,973,212 A * 11/1990 Jacobs .................. F16B 5/0642
24/297
5,597,280 A 1/1997 Stern

FOREIGN PATENT DOCUMENTS

| | | |
|---|---|---|
| JP | 62-247941 | 10/1987 |
| JP | 5-58914 | 8/1993 |
| JP | 2001-45636 | 2/2001 |
| JP | 2002-218632 | 8/2002 |
| JP | 2006-25506 | 1/2006 |
| JP | 2011-213172 | 10/2011 |

* cited by examiner

BAND CLIP AND ASSEMBLY

BACKGROUND

1. Field of the Invention

The present invention relates to a band clip.

2. Description of the Related Art

In the case that a wiring harness is arranged and a floor carpet is laid on a floor of a vehicle such as an automotive vehicle, a wiring harness with band clip and a floor carpet are normally prepared, the wiring harness with band clip is mounted in a vehicle body and the floor carpet is mounted from above the wiring harness with band clip in the vehicle body.

Japanese Unexamined Patent Publication No. 2011-213172 relates to a wiring harness bound by a binding band of a band clip and a clip of the band clip is coupled to a floor carpet, whereby an assembly of the band clip, the wiring harness and the floor carpet is prepared. The assembly is mounted in a vehicle body.

An operation of separately preparing the wiring harness with band clip and the floor carpet and mounting them in the vehicle body requires many man-hours. This problem is solved by preparing the assembly of the band clip, the wiring harness and the floor carpet and mounting the assembly in the vehicle body as shown in Japanese Unexamined Patent Publication No. 2011-213172.

However, in the assembly of Japanese Unexamined Patent Publication No. 2011-213172, the projection of a "locking jaw 4b" toward a vehicle interior side is problematic since the "locking jaw 4b" arranged on the vehicle interior side is not flat. Further, a load from the vehicle interior side toward a vehicle body side may be applied to the floor carpet. In this situation, the "locking jaw 4b" arranged on the vehicle body side partly or entirely moves from the vehicle body side to the vehicle interior side. As a result, the projection of the "locking jaw 4b" toward the vehicle interior side becomes further notable. This problem also occurs such as when a linear object other than the wiring harness is bound by the binding band and when the clip is coupled to a sheet-like object other than the floor carpet.

The present invention is made to solve this problem and aims to provide a band clip whose projection from a sheet-like object is suppressed.

SUMMARY

The invention relates generally to a band clip that may include a binding band and a clip. The binding band may include a head and a strap. The clip may include a plurality of first linear objects, a second linear object and a plate-like object. One end of the second linear object may be coupled to a base end of each of the plurality of first linear objects. Each first linear object may be at an angle not larger than 90° to the second linear object. The first linear objects may be arranged in a distributed manner in a circumferential direction. Each of the first linear objects may be resiliently deformable to extend along the second linear object. Another end of the second linear object may be coupled to one principal surface of the plate-like object. The head may be coupled to another principal surface of the plate-like object.

The plurality of flat first linear objects may be arranged on one principal surface side of a sheet-like object when the clip is coupled to the sheet-like object. Further, the plate-like object regulates a movement of the clip from another principal surface side to the one principal surface side of the sheet-like object. Thus, the projection of the band clip from the sheet-like object is suppressed.

The clip may further include a cushion. The cushion may be formed with a through hole, and the second linear object may be passed through the through hole. The cushion suppresses rattling of the band clip.

The invention may relate to an assembly that includes the above-described band clip a binding band including a head and a strap, and a clip including a plurality of first linear objects, a second linear object and a plate-like object, each of the plurality of first linear objects having a base end, the second linear object having a first end part and a second end part, the plate-like object having a first principal surface and a second principal surface, the first end part being coupled to the base end of each of the plurality of first linear objects, each of the first linear objects being at an angle not larger than 90° to the second linear object, the plurality of linear objects being arranged in a distributed manner in a circumferential direction, each of the plurality of first linear objects being resiliently deformable to extend along the second linear object, the second end part being coupled to the first principal surface and the head being coupled to the second principal surface.

These and other objects, features, aspects and advantages of the present invention will become more apparent by the following detailed description of the present invention when considered in connection with the accompanying drawings.

DETAILED DESCRIPTION

Figure 1:
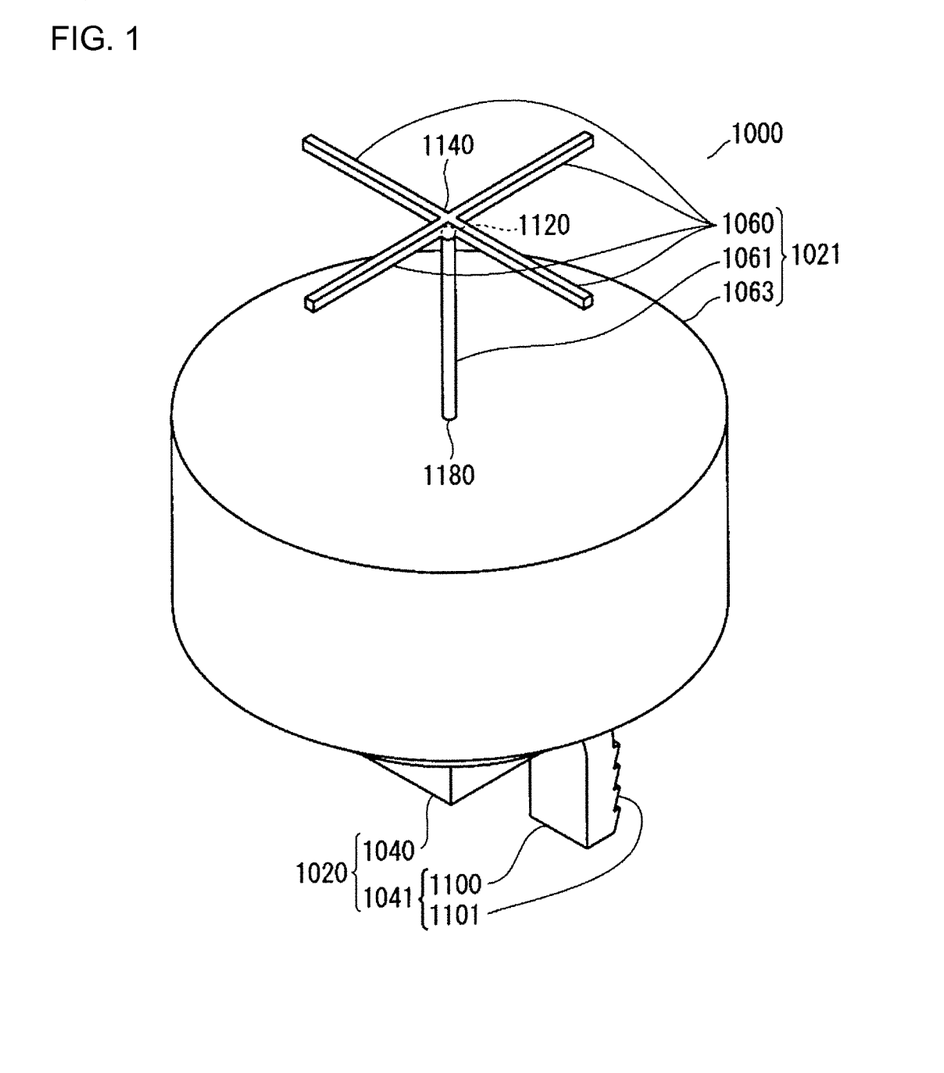
FIG. 1 is a perspective view of a band clip.
Figure 2:
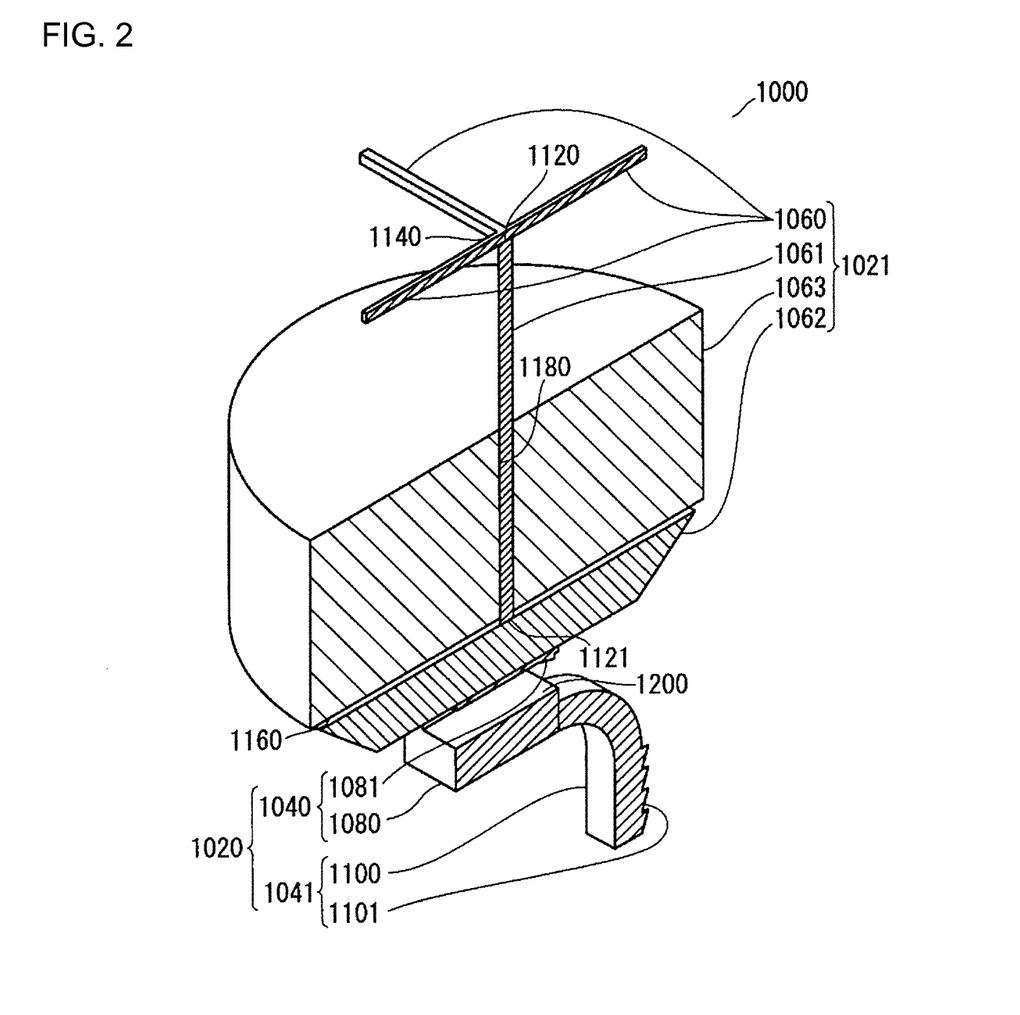
FIG. 2 is a perspective view of the band clip.
Figure 3:
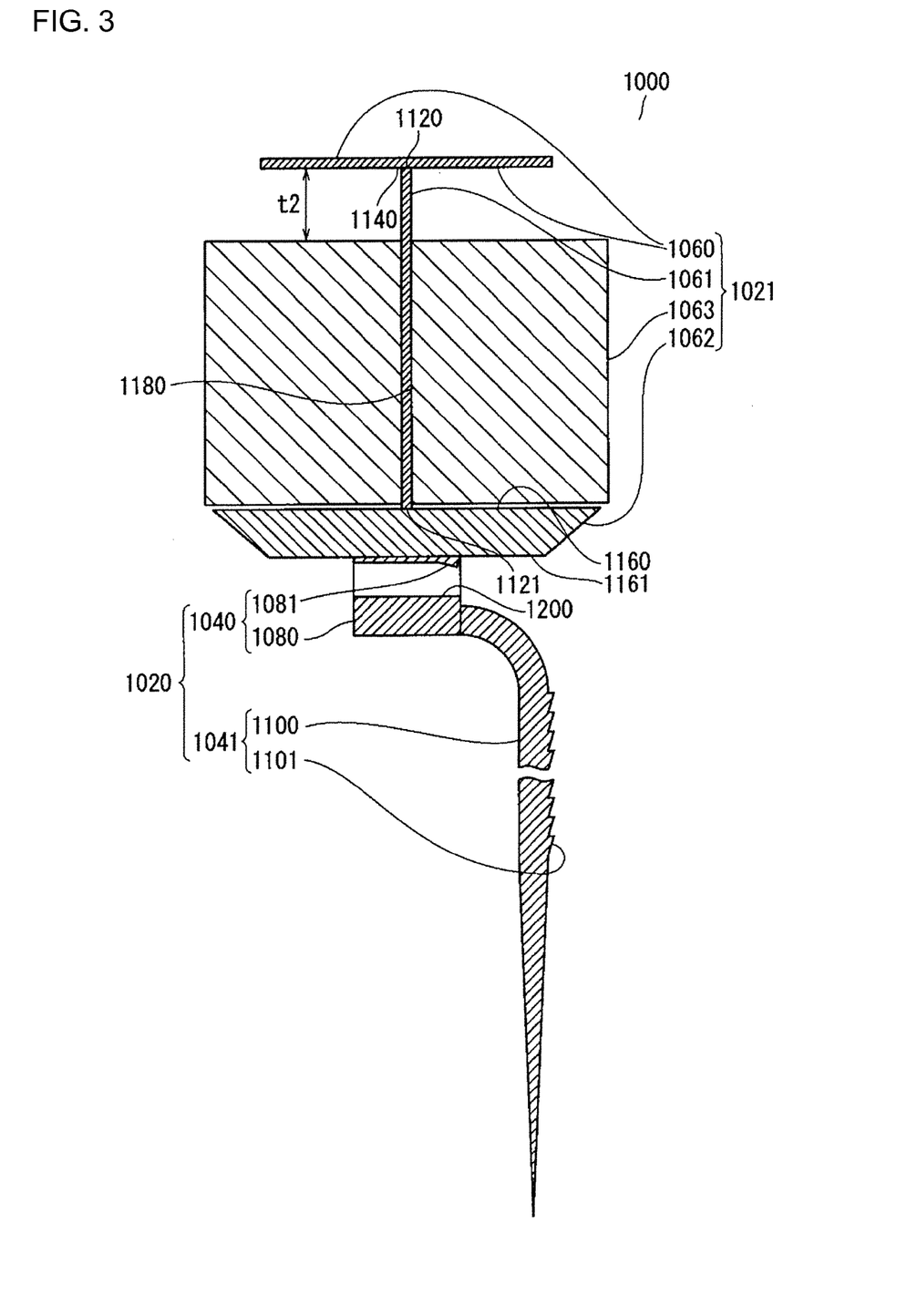
FIG. 3 is a section of the band clip.

A perspective view of FIG. 1, a perspective view of FIG. 2 and a section of FIG. 3 schematically show a band clip 1000 of this embodiment. FIG. 2 shows a state where the band clip 1000 is cut in half at a vertical section.

As shown in FIGS. 1 to 3, the band clip 1000 includes a binding band 1020 and a clip 1021. The binding band 1020 includes a head 1040 and a strap 1041. The clip 1021 includes a plurality of retainers 1060, a penetrating body 1061, a piercing stopper 1062 and a cushion 1063. The head 1040 includes a passage forming body 1080 and a retaining claw 1081. The strap 1041 includes a strip-like portion 1100 and a plurality of projecting portions 1101. The band clip 1000 may include constituent elements other than these constituent elements. Both or either one of the number of the plurality of retainers 1060 and the number of the plurality of projecting portions 1101 may be increased or decreased. The binding band 1020 is planned to bind a wiring harness. The clip 1021 is planned to be coupled to a floor carpet. The binding band 1020 may bind a linear object other than the wiring harness. The clip 1021 may be coupled to a sheet-like object other than the floor carpet.

The plurality of retainers 1060 and the penetrating body 1061 are linear objects. A coupled object of the plurality of retainers 1060 and the penetrating body 1061 has a structure similar to that of a tag pin used such as in the case of mounting a tag to a product. In the tag pin, the plurality of retainers 1060 are referred to as "crossbars" and the penetrating body 1061 is referred to as a "filament" in some cases.

The piercing stopper 1062 and the cushion 1063 are disc-like objects. Both or either one of the piercing stopper 1062 and the cushion 1063 may be plate-like object(s) other than the disc-like object(s). For example, both or either one of the piercing stopper 1062 and the cushion 1063 may be elliptical plate-like object(s).

One end part 1120 of the penetrating body 1061 is coupled to each of base ends 1140 of the plurality of retainers 1060. Another end part 1121 of the penetrating body 1061 is coupled to a center of one principal surface 1160 of the piercing stopper 1062. The other end part 1121 of the penetrating body 1061 may be coupled at a position slightly shifted from the center of the one principal surface 1160 of the piercing stopper 1062. The head 1040 is coupled to another principal surface 1161 of the piercing stopper 1062.

Each of the plurality of retainers 1060 is at an angle of 90° to the penetrating body 1061. This makes the plurality of retainers 1060 flat. Each of the plurality of retainers 1060 may be at an angle smaller than 90° to the penetrating body 1061. Also in this case, when the clip 1021 is mounted on the floor carpet, an angle between each of the plurality of retainers 1060 and the penetrating body 1061 is widened and the plurality of retainers 1060 become substantially flat.

The retainers 1060 are arranged in a distributed manner in a circumferential direction. Although the retainers 1060 desirably are arranged at equal angles, they may not be arranged at equal angles in some cases. The circumferential direction is a direction circling around the penetrating body 1061 with the penetrating body 1061 as an axis.

Each of the plurality of retainers 1060 can be bent near the base end 1140 and resiliently deformed to extend along the penetrating body 1061.

A through hole 1180 is formed in a center of the cushion 1063, but may be formed at a position slightly shifted from the center of the cushion 1063. The penetrating body 1061 penetrates through the through hole 1180. The cushion 1063 is omitted in some cases.

The cushion 1063 desirably is formed of foamed urethane, but the cushion 1063 may be formed of a resilient material other than foamed urethane. The cushion 1063 is compressed in an extending direction of the penetrating body 1061 when the penetrating body 1061 is pressed in the extending direction. If the cushion 1063 is not compressed in the extending direction of the penetrating body 1061, a clearance t2 between the cushion 1063 and the plurality of retainers 1060 shown in FIG. 3 is narrower than a thickness t1 of a floor carpet 1221 shown in FIG. 4. When the cushion 1063 is compressed in the extending direction of the penetrating body 1061, the clearance between the cushion 1063 and the plurality of retainers 1060 is widened.

A thickness of the piercing stopper 1062 is constant from the center to the vicinity of the edge and becomes smaller toward the edge from the vicinity of the edge to the edge. A thickness distribution of the piercing stopper 1062 may be changed.

The one principal surface 1160 of the piercing stopper 1062 is flat. The other principal surface 1161 of the piercing stopper 1062 is flat from the center to the vicinity of the edge. The one principal surface 1160 of the piercing stopper 1062 is at 90° to the penetrating body 1061.

A thickness of the cushion 1063 is constant. A thickness distribution of the cushion 1063 may be changed.

The passage forming object 1080 is formed with a strap passage 1200. The retaining claw 1081 projects from an inner surface of the strap passage 1200. The projecting portions 1101 project from a principal surface of the strip-like portion 1100 and are arranged in a length direction of the strip-like portion 1100.

The binding band 1020 and the clip 1021 are made of resin. The binding band 1020 and the clip 1021 may be entirely or partly made of a material other than resin.

Figure 4:
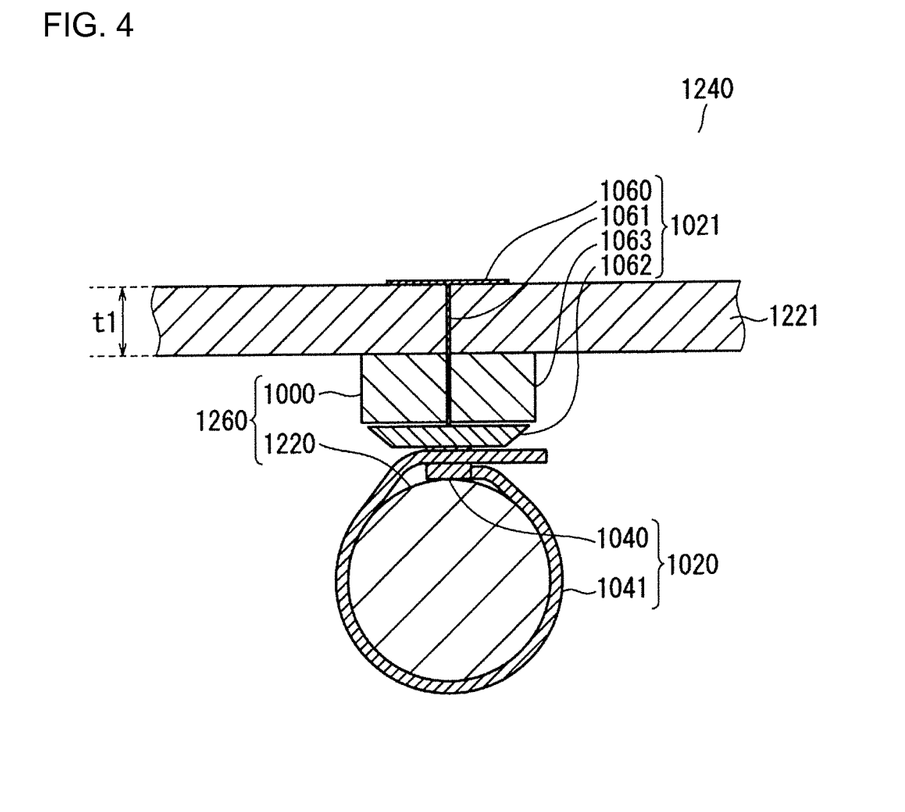
FIG. 4 is a section of an assembly.
Figure 5:
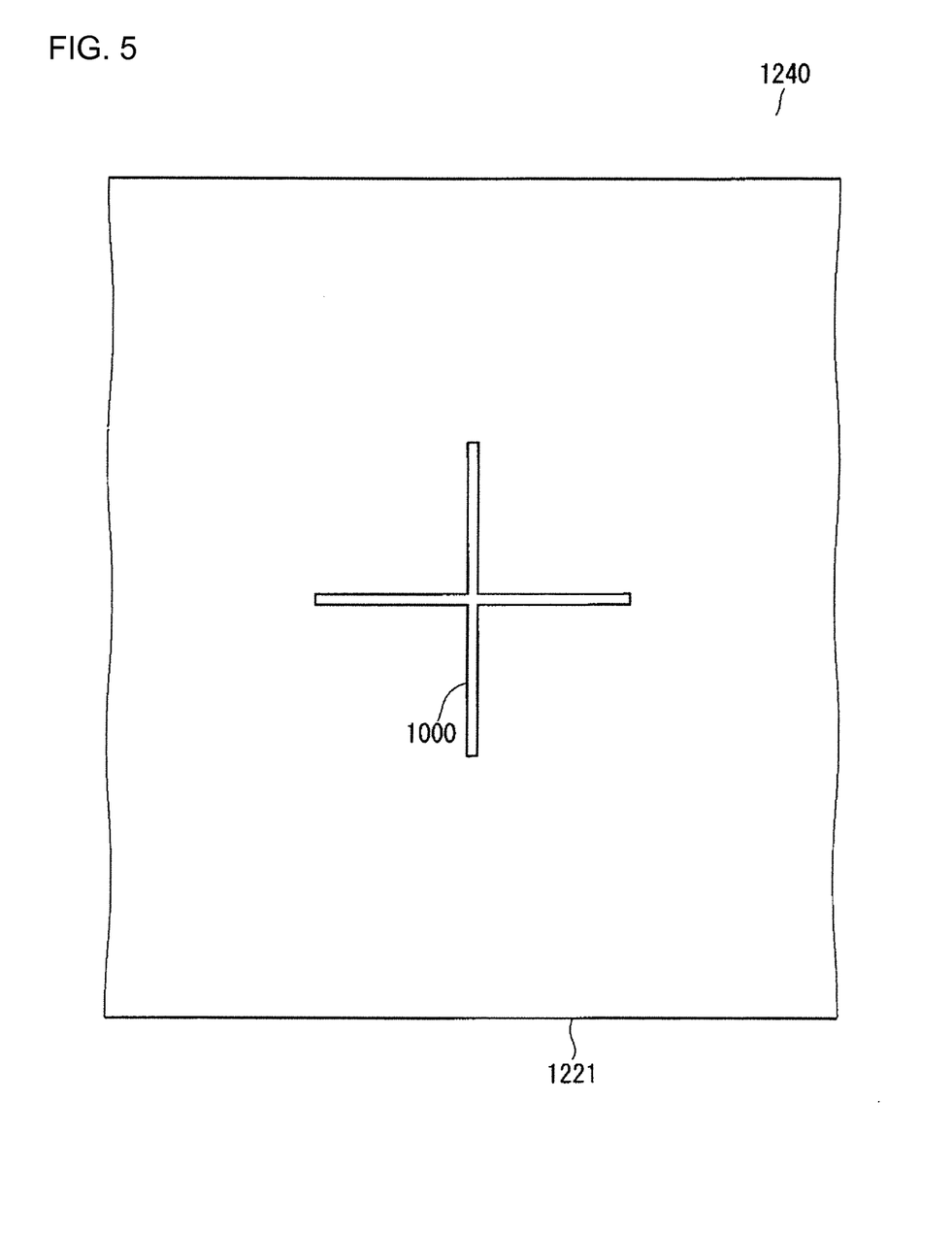
FIG. 5 is a top view of the assembly.

A section of FIG. 4 and a top view of FIG. 5 schematically show an assembly 1240 of the band clip 100, a wiring harness 1220 and the floor carpet 1221.

The assembly 1240 is laid on a floor of a vehicle interior of an automotive vehicle. In the case of laying the assembly 1240 on the floor of the vehicle interior of the automotive vehicle, the wiring harness 1220 is arranged closer to a vehicle body side than the floor carpet 1221. The assembly 1240 may be laid other than on the floor of the vehicle interior of the automotive vehicle. According to the assembly 1240, man-hours for mounting the wiring harness 1220 and the floor carpet 1221 are reduced.

As shown in FIGS. 4 and 5, the wiring harness 1220 is bound by the binding band 1020 and the clip 1021 is coupled to the floor carpet 1221 in the assembly 1240.

In the case of binding the wiring harness 1220 by the binding band 1020, the strap 1041 is passed through the strap passage 1200 to form a loop of the strap 1041. The wiring harness 1220 is tightened by the loop of the strap 1041. One of the plurality of projecting portions 1101 is caught by the retaining claw 1081 to regulate the slip-out of the strap 1041 from the strap passage 1200.

In the case of coupling the clip 1021 to the floor carpet 1221, the penetrating body 1061 penetrates through the floor carpet 1221 and the plurality of retainers 1060 and the piercing stopper 1062 sandwich the floor carpet 1221. The cushion 1063 is arranged between the floor carpet 1221 and the piercing stopper 1062 to fill up a clearance between the floor carpet 1221 and the piercing stopper 1062. The cushion 1063 is compressed in the extending direction of the penetrating body 1061. In this way, the rattling of the band clip 1000 is suppressed.

In the case of coupling the clip 1021 to the floor carpet 1221, the flat retainers 1060 are arranged on a vehicle interior side. Thus, the projection of the band clip 1000 from the floor carpet 1221 is suppressed. Further, the piercing stopper 1062 regulates a movement of the clip 1021 from the vehicle body side to the vehicle interior side. Thus, the projection of the band clip 100 from the floor carpet 1221 is suppressed. In this way, the projection of the band clip 1000 toward the vehicle interior side is suppressed.

Figure 6:
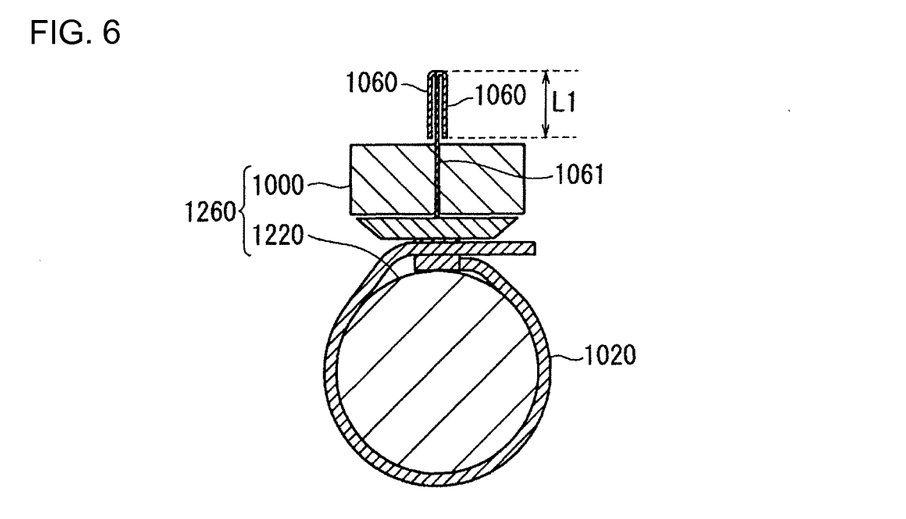
FIG. 6 is a section of an unfinished product of the assembly.
Figure 7:
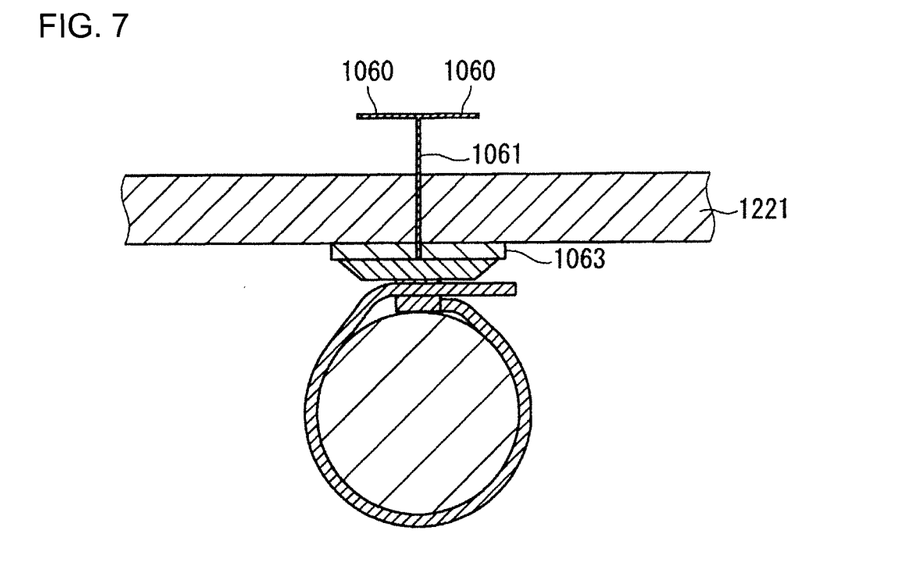
FIG. 7 is a section of the unfinished product of the assembly.

Sections of FIGS. 6 and 7 schematically show an unfinished product of the assembly 1240.

In the case of assembling the assembly 1240, the wiring harness 1220 is bound by the binding band 1020 to prepare a wiring harness with band clip 1260.

The clip 1021 then is mounted on a gun similar to a tag gun for tag pin. In this way, as shown in FIG. 6, each of the retainers 1060 can be deformed resiliently to extend along the penetrating body 1061 and the retainers 1060 can penetrate through the floor carpet 1221. A length L1 of each of the plurality of retainers 1060 is longer than the clearance t2 between the cushion 1063 and the plurality of retainers 1060 shown in FIG. 3. When the clip 1021 is mounted in the gun and the plurality of retainers 1060 and the penetrating body 1061 are driven into the floor carpet 1221, the cushion 1063 is compressed in the extending direction of the penetrating body 1061 and each of the retainers 1060 can be deformed resiliently to extend along the penetrating body 1061 without interfering with the cushion 1063.

Subsequently, the plurality of retainers 1060 and the penetrating body 1061 are driven into the floor carpet 1221 and, as shown in FIG. 7, the retainers 1060 pass through the floor carpet 1221. At this time, the cushion 1063 is compressed farther in the extending direction of the penetrating body 1061. It is not necessary to perforate the floor carpet 1221 before driving. The clearance between the cushion 1063 and the plurality of retainers 1060 is widened temporarily and the retainers 1060 are separated from the floor carpet 1221. The retainers 1060 that were deformed resiliently to extend along the penetrating body 1061 return to an original flat shape.

Subsequently, the compression of the cushion 1063 in the extending direction of the penetrating body 1061 is alleviated and, as shown in FIG. 4, the clearance between the floor carpet 1221 and the piercing stopper 1062 is filled up with the cushion 1063. Also at this time, the cushion 1063 is in a state compressed in the extending direction of the penetrating body 1061. In this way, the rattling of the band clip 1000 is suppressed. The clearance t2 between the cushion 1063 and the plurality of retainers 1060 shown in FIG. 3 may be matched with the thickness t1 of the floor carpet 1221 and the cushion 1063 may return to a non-compressed state.

The wiring harness 1220 electrically connects two or more devices mounted in the automotive vehicle. The wiring harness 1220 typically is branched and electrically connects three or more devices. The wiring harness 1220 may electrically connect two devices without being branched.

Although the present invention has been described in detail above, the above description is not restrictive, but illustrative in all aspects. Thus, it is understood that numerous modifications and variations can be devised without departing from the scope of the present invention.

LIST OF REFERENCE SIGNS

1000 band clip
1020 binding band
1021 clip
1040 head
1041 strap
1060 plurality of retainers
1061 penetrating body
1062 piercing stopper
1063 cushion
1220 wiring harness
1221 floor carpet
1240 assembly
1260 wiring harness with band clip

The invention claimed is:

1. A band clip configured to be attached to a supporting surface, comprising:
    a binding band including a head and a strap;
    a piercing stopper coupled to the head, the piercing stopper having at least one surface;
    a resiliently deformable cushion having opposite first and second surfaces and a through hole extending between the first and second surfaces, the first surface facing the piercing stopper;
    a linear penetrating body extending through the through hole and having opposite first and second ends, the first end coupled to the piercing stopper and the second end projecting beyond the second surface of the cushion; and
    a plurality of linear objects extending from the second end of the linear penetrating body at a 90° angle to the linear penetrating body and being resiliently deformable to extend along the linear penetrating body, wherein
    the linear penetrating body penetrates the supporting surface so that the supporting surface is arranged between and in close contact with the cushion and the plurality of linear objects.

2. An assembly, comprising:
    a band clip comprising:
        a binding band including a head and a strap;
        a piercing stopper coupled to the head, the piercing stopper having at least one surface;
        a resiliently deformable cushion having opposite first and second surfaces and a through hole extending between the first and second surfaces, the first surface facing the piercing stopper;
        a linear penetrating body extending through the through hole and having opposite first and second ends, the first end coupled to the piercing stopper and the second end projecting beyond the second surface of the cushion; and
        a plurality of linear objects extending from the second end of the linear penetrating body at a 90° angle to the linear penetrating body and being resiliently deformable to extend along the linear penetrating body;
    a wiring harness to be bound by the binding band; and
    a floor carpet through which the linear penetrating body penetrates and that is sandwiched by the plurality of linear objects and the resiliently deformable cushion.

* * * * *